SPATIAL FREQUENCY MASK

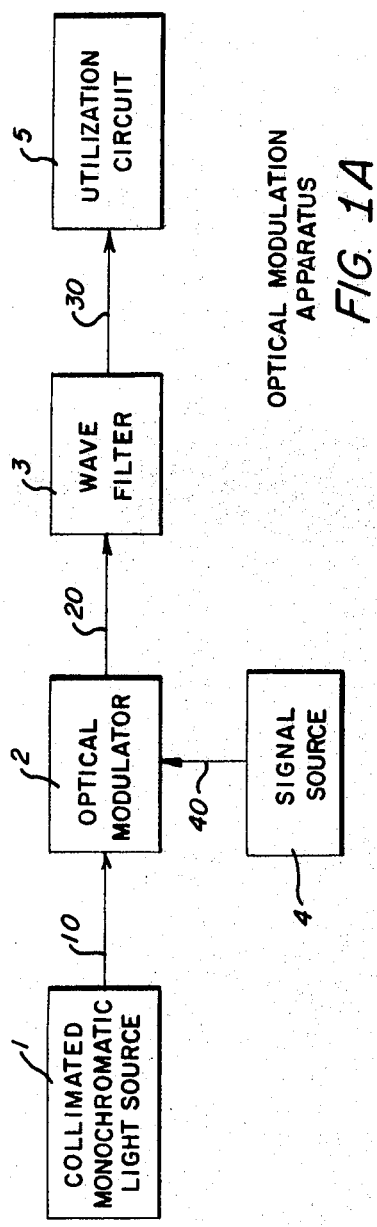
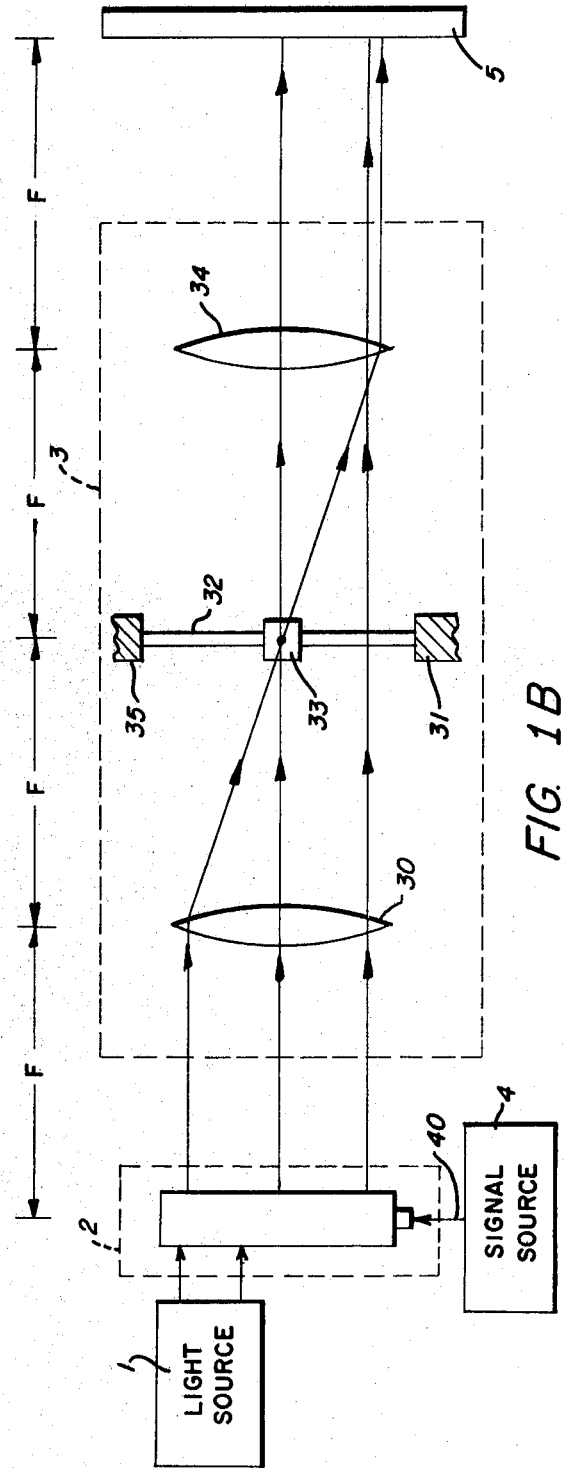

LIGHT INTENSITY VARIATION—
PHASE RETARDATION CHARACTERISTIC

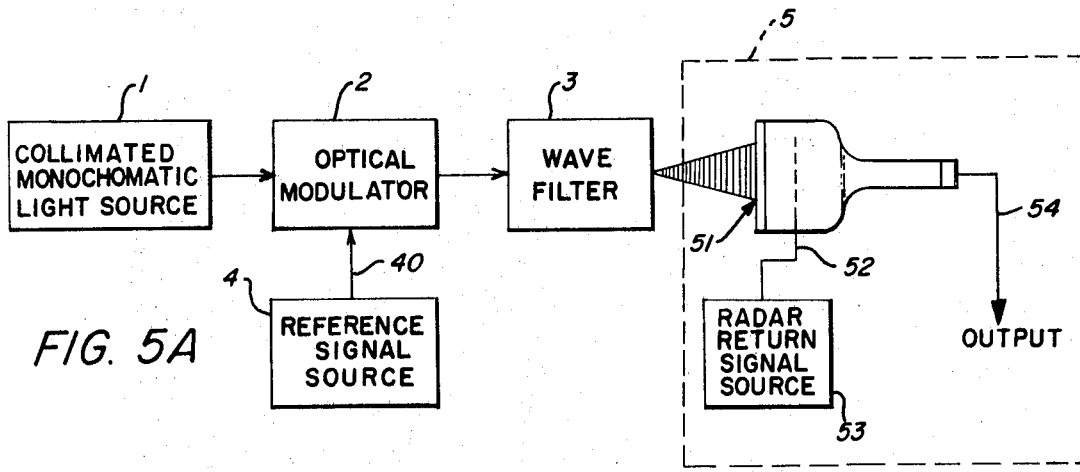
FIG. 5A
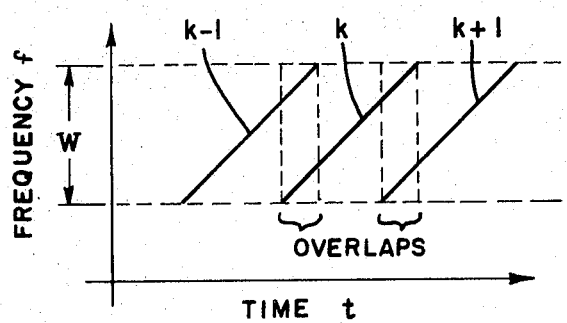
FIG. 5B
RADAR RETURN "CHIRP" SIGNALS
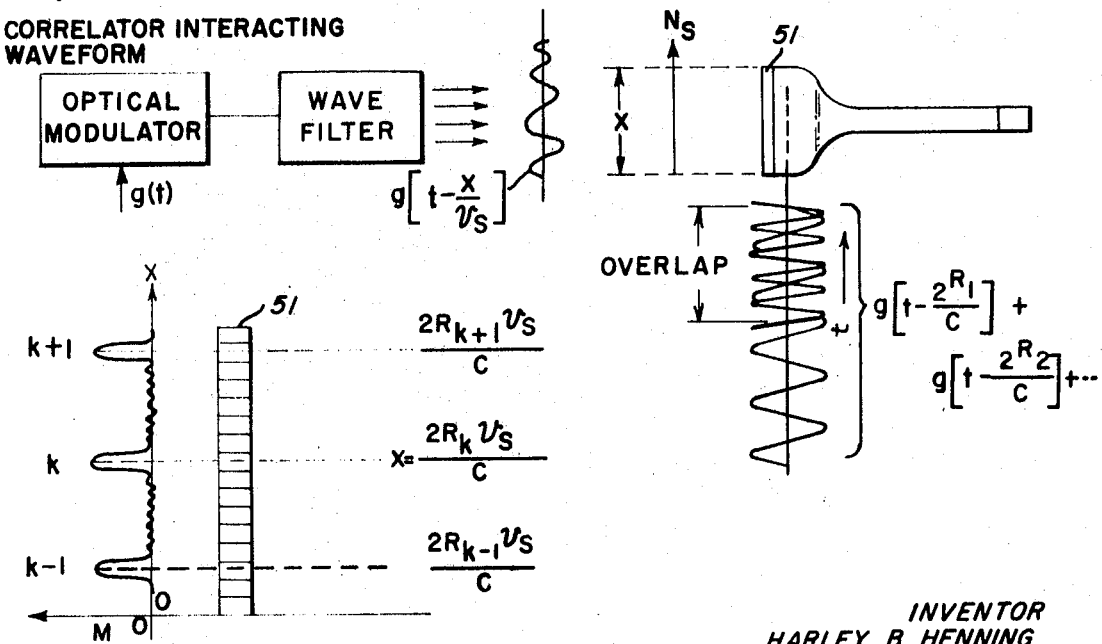
FIG. 5C
CORRELATOR INTERACTING WAVEFORM
FIG. 5D
INVENTOR
HARLEY B. HENNING
BY
ATTORNEY 3,536,376
OPTICAL MODULATION APPARATUS HAVING A PHASE RETARDING SPATIAL FILTER
Harley Barry Henning, Sharon, Mass., assignor to Raytheon Company, Lexington, Mass., a corporation of Delaware
Filed Mar. 6, 1968, Ser. No. 711,061
Int. Cl. G02b 27/38
U.S. Cl. 350—161                                    7 Claims

ABSTRACT OF THE DISCLOSURE

An optical modulation apparatus comprising means having a sinusoid light intensity variation versus phase retradation characteristic and which are responsive to a modulating signal for varying the intensity of an incident collimated monochlormatic light beam. The apparatus further includes means for maintaining the modulation quiescent operating point within a predetermined region of the characteristic. Also disclosed is a correlation apparatus in which the optical modulator applies intensity and spatially varying light representative of modulating first signals to a multiplying means responsive to modulated second signals to form distinct product signals which may be integrated over a time interval.

BACKGROUND OF THE INVENTION

This invention was made pursuant to a contract with the U.S. Air Force.

This invention relates to optical modulation apparatuses and, more particularly, to optical modulators having a sinusoidal light intensity variation verses a phase retardation characteristic.

In the prior art, as for example shown in U.S. Pat. 3,189,746 issued on June 15, 1965 to L. Slobodin et al., it is shown that a transparent acoustic delay line responsive to modulated signals may be used for spatially varying the electric field of an incident collimated monochromatic light beam. The emergent spatially varying wave may be further "modulated" by means of a mask interposed in its path. Such prior art system do not, however, exercise any extensive degree of control as to the linearity or the non-linearity of their operation.

It is accordingly an object of this invention to devise an optical modulation apparatus in which the linearity or non-linearity of its operation may be selectively controlled.

In many applications it is desirable to use linear modulators. However, such linear modulators possess several disadvantages. A first disadvantage is that the depth of modulation must be kept small. The second disadvantage is that the zero frequency light component forms a necessary part of the output signal and may not be available for reuse by any other portion of an optical system. A third disadvantage is that the zero frequency light component represents spurious background illumination that may be considered to form of noise.

It is accordingly another object of this invention to devise a linear type of optical modulator which permits a substantial depth of modulation.

In certain object location systems, such as radar, return or echo signals often overlap each other in time at the receiver. It is desirable for signal detection purposes to be able to separate such overlapping signals from each other. One class of signal devices for performing such signal separation and detection are called correlators.

It is yet another object of this invention to utilize the optical modulator in a correlation apparatus for improving the signal separation and detection function of such apparatus.

Let us consider some fundamental concepts concerning the transparent acoustic delay line and the interaction between the incident collimated monochromatic beam and an external signal launched within the delay line. These concepts provide a basis for more fully appreciating the invention and in increasing the efficiency of explanation. The externally applied signal may be a varying voltage $e(t)$. This is applied to an appropriate acoustic transducer which launches a corresponding wave traveling a velocity $v$ along a propagation path $x$. This propagation path is transverse to the incident light beam. The applied voltage will set up a localized pressure variation. This, in turn, will vary the index of refraction. If one selects a point which is an arbitrary distance along the propagation path away from the transducer, he will see the localized pressure variations of that signal which had been applied to the transducer $x/v$ seconds earlier. Indeed, the localized pressure and index of refraction and the wave at any point along the path may be represented respectively as $$p\left(t-\frac{x}{v}\right); n\left(t-\frac{x}{v}\right); \text{ and } e\left(t-\frac{x}{v}\right)$$

The incident monochromatic beam must propagate through a medium having a varying index of refraction. The electric field of the emergent light beam $E$ may be shown to be proportional to $$\epsilon^{jk\left(t-\frac{x}{v}\right)}$$

in the established convention notation, $j$ being the $\sqrt{-1}$. In this proportionality $k$ may be taken as a constant.

Phase shift or phase delay of a wave moving through a medium is a function of $2\pi ln/\lambda$, where $l$ is the physical path length, $n$ the index of refraction, and $\lambda$ the free space wavelength. The phase delay $\Delta\phi_1$ of the light beam going through an *unexcited* transparent delay line of thickness $l$ may be represented by $2\pi n_1 l/\lambda$.

The phase delay $\Delta\phi_2$ occasioned when the delay line is excited is $$\frac{2\pi n\left(t-\frac{x}{v}\right)l}{\lambda}$$

The term *phase retardation characteristic* $\phi$ refers to the difference $(\Delta\phi_2-\Delta\phi_1)$ between light emergent from the modulator with excitation and without excitation for every point $x$ along the interacting acoustic path. The phase retradation characteristic $\phi$ is mathematically represented as $$2\pi l\left(n\left(t-\frac{x}{v}\right)-n_1\right)$$

This may be more simply expressed as $$\phi\left(t-\frac{x}{v}\right)$$

SUMMARY OF THE INVENTION

The above-mentioned objects of this invention are satisfied in an embodiment which recognizes that an optical modulation apparatus may be deemed to have a performance characteristic which describes the relationship among the variables of interest. With regard to this invention the performance characteristic of interest is the variation of light intensity $I$ taken at the output of the apparatus and the phase retardation $\phi$.

Thus, the inventive embodiment comprises means having a sinusoidal light intensity variation versus phase retardation characteristic responsive to modulated signals for varying the intensity of an incident collimated monochromatic light beam. Additional means are used for maintaining the modulator operating point within a predetermined region of the characteristic.

In more specific terms, the modulating means may comprise a transparent acoustic responsive transducer which spatially varies the electric field of an incident collimated monochromatic light beam as the applied modulating signal varies. The means for maintaining the modulator operating point in a predetermined region of the characteristic may comprise a mask upon which the varying electric field is projected. The center portion of the mask includes an element for retarding the phase of the zero frequency electric field component by a predetermined fraction of the fundamental frequency electric field component wavelength. The fundamental frequency wavelength $\lambda$ is the free space wavelength of the collimated monochromatic light. The area adjacent to the center portion of the mask attenuates the non-zero frequency spatial component by a predetermined magnitude. As a consequence of the selective phase shift of the zero frequency component and the attenuation of the non-zero frequency components, the quiescent operating point of the modulator may be positioned on a substantially linear or a non-linear portion of the characteristic curve.

Illustratively, an operating point providing a maximum degree of linearity may be selected if the center portion phase shift element is set equal to one-eighth of the fundamental frequency wavelength, and, if the attenuation of the non-zero frequency components is $1/\sqrt{2}$.

In a cross correlation apparatus embodiment, the optical modulator may be made responsive to modulated first signals which vary the intensity of an incident monochromatic light beam with a moving waveform image being produced within the beam. Multiplication means responsive to the light beam and to modulated second signals form distinctive product signals which product signals may be conveniently integrated.

If an image orthicon tube is positioned such that the varying light beam shines upon the tube face, and the tube scanning beam is modulated by the second signals, then distinctive product signals will yield peaked values measured at the tube output.

BRIEF DESCRIPTION OF THE DRAWINGS

FIG. 1A is a block diagram representation of the optical modulation apparatus;

FIG. 1B is a partial block diagram of the apparatus shown in FIG. 1A illustrating the structure of the optical modulator and wave filter;

FIG. 5A is a block diagram of a correlation apparatus using the optical modulation apparatus of FIG. 1A;

FIG. 5B shows overlapping modulated signals applied to the correlation apparatus;

FIG. 5C is illustrative of the waveform interaction between modulated first signals and overlapping modulated second signals;

FIG. 5D shows the separated peaked product signals resulting from the correlation process operating upon the overlapped second modulated signals shown in FIGS. 5B and 5C.

DESCRIPTION OF THE PREFERRED EMBODIMENTS

Figure 2:
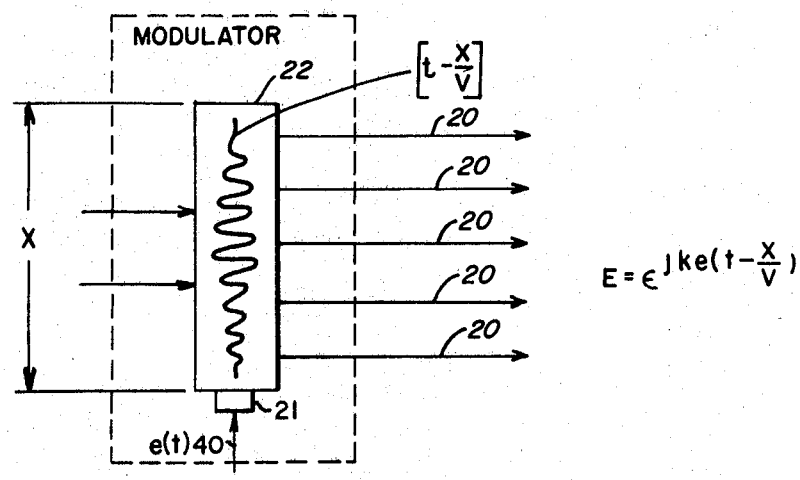
FIG. 2 shows the interaction between an incident monochromatic light beam and acoustic modulated signals within the modulator.

FIG. 1A shows a block diagram of the optical modulation apparatus. Optical modulator 2 responsive to modulated signal 4 spatially varies the electric field component of an incident collimated monochromatic light 1. A wave filter 3 delays the zero frequency (DC) electric field component by a predetermined amount of the wavelength of the fundamental frequency component. The spatially varying electric field is incident upon wave filter 3 over path 20. A utilization circuit 5 is coupled to the output of wave filter 3 over path 30.

This block diagram is instrumented as shown in FIG. 1B. An optically transparent acoustic delay line 2 operates as the optical modulator upon the incident monochromatic light 1. The spatially varying electric field output from modulator 2 is applied to wave filter 3. Wave filter 3 comprises a first condensing lens 30, a mask 31, and a second condensing lens 34. The first condensing lens 30 is positioned a focal length away from the optical modulator 2. Similarly, mask 31 is positioned another focal length away from lens 30. The second condensing lens 34 is positioned on the opposite side of mask 31 by yet another focal length. Utilization circuit 5 represented as a surface in FIG. 1B is positioned at another focal length on the opposite side of lens 34. Mask 31 comprises a center portion having a delay element 33 and adjacent portion 32.

SELECTION OF A PERFORMANCE CHARACTERISTIC

Figure 4:
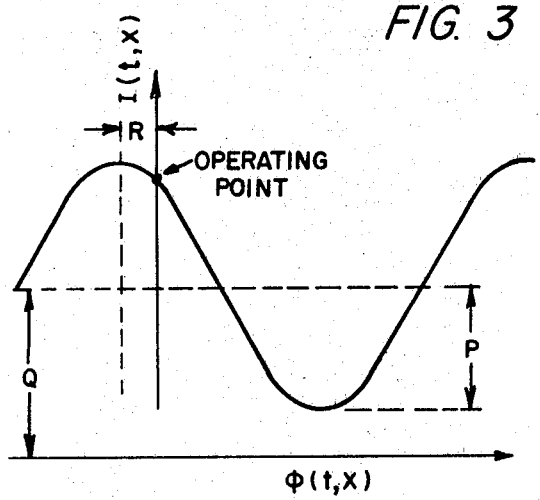
FIG. 4 shows the light intensity variation versus the phase retardation characteristic of the apparatus shown in FIG. 1A as measured at the input to the utilization circuit.

In order to exercise control over the linear and non-linear operation of an optical modulation apparatus it is desirable to map the performance or operation of the apparatus into a mathematical plane of relevant variables. One such plane is that of the light intensity versus phase retardation characteristic. It should be remembered that light intensity I is the product of an electric field E multiplied by its complex conjugate E*. As mentioned in the specification introduction, phase retardation is defined as the phase difference of the light of a given intensity emerging from the optical modulator with and without excitation. Thus, for any given optical modulator it is possible to construct a static characteristic curve of light intensity variation versus phase retardation. Attention is directed to FIG. 4 as illustrative of such a retardation characteristic. A more detailed discussion of the derivation of the characteristic curve shall be made in connection with the description of FIG. 4.

LINEARITY AND NON-LINEARITY OF OPERATION

Having adduced a characteristic curve, the question of control of the performance of a modulation apparatus is reduced to the problem of maintaining the quiescent operating point at a linear or non-linear point on the characteristic curve.

FIG. 2 shows an acoustic delay line 22 which performs the modulation function for modulator 2. A time varying voltage $e(t)$ is applied on line 40 to electro-acoustic transducer 21. Transducer 21 is affixed at one end of acoustic delay line 22. The delay line may be any one of a number of optically permeable elements such as quartz. A pressure wave introduced by the change in mechanical dimension of transducer 21 is likewise introduced as a local acoustic disturbance and is propagated down an acoustic path of length $x$ at velocity $v_S$. The acoustic path is transverse to and intersects a beam of collimated monochromatic light from source 1. Now the local pressure disturbance $p$ at any point $x$ along the propagation path is $$p\left(t - \frac{x}{v_S}\right)$$

Correspondingly, the index of refraction at that point is $$n\left(t - \frac{x}{v_S}\right)$$

The cognate of the applied signal $e(t)$ is $$e\left(t-\frac{x}{v_B}\right)$$

Thus, $$t-\frac{x}{v_B}$$

is a point earlier in time than $t$. The index of refraction may have different values along the linear extent $x$ at any instant of time. Likewise, at any instant of time, the electric field E of the emerging light will be distributed in a pattern which can be substantially approximated by an exponential function. Thus, E is proportional to $$\epsilon^{jke\left(t-\frac{x}{vs}\right)}$$

For purposes of simplification we substitute the symbol $\phi$ for the symbol $$ke\left(t-\frac{x}{v_B}\right)$$

It is understood that $\phi$ stands for the phase retardation characteristic. Since the intensity of the unmodulated beam emereging from modulator 22 will remain constant, no loss of generality nor confusion should arise. As is shown in FIG. 1B, lens 30 focusses the emerging waves upon mask 31. The structure of mask 31 is shown in FIG. 3.

Figure 3:
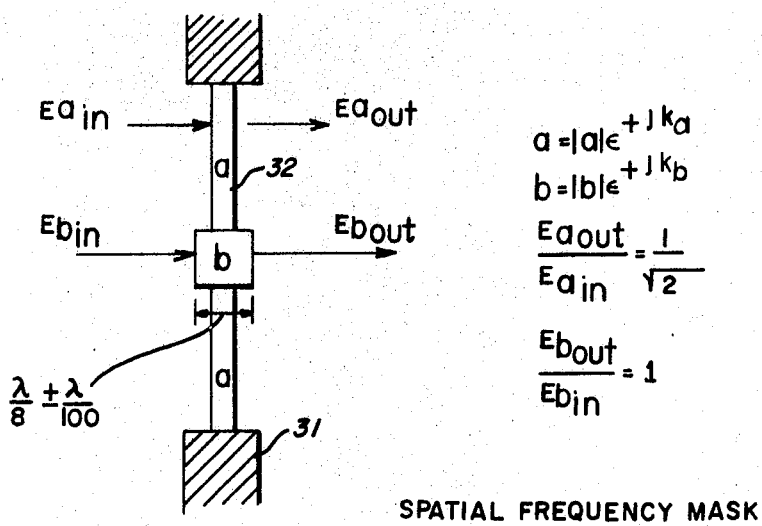
FIG. 3 shows the structural features of the spatial frequency mask emphasizing attenuation and phase shift.

In FIG. 3, the mask 31 comprises an outer portion 32 which attenuates the non-zero phase component of the applied waveform and a center portion having an element which delays the zero frequency component by a portion of the fundamental frequency component wavelength. The following discussion will be directed toward considering the generation of the intensity I versus phase $\phi$ characteristic taking into account the structure of the mask.

The electric field $E_{in}$ applied to the mask may be made equal to $\epsilon^{j\phi}$. For purposes of simplicity, the coefficient multiplying the power raised to an exponent is taken as unity.

The emergent light beam comprises a zero frequency (so called DC component) consisting of undiffracted light, and a diffracted light component. Let $\epsilon^{j\phi}-1$ represent the diffracted light and 1 represent the DC or undiffracted light.

It is known in the prior art, that the DC or undiffracted light passes through the center element and the diffracted light is distributed over the outer portion of the mask. Let $a$ equal the attenuation of the adjacent outer mask portion and let $b$ be attenuation of the center portion. Also, let $k$ be the angular phase shift or delay of the corresponding attenuation. Thus, the electric field $E_{out}$ may be represented by $a(\epsilon^{j\phi}-1)+b$. This is equal to $a\epsilon^{j\phi}+(b-a)$. Let us stipulate that $c$ is equal to $b-a$. Thus, $E_{out}=\epsilon^{j\phi}+c$.

Let $a=/a/\epsilon^{jk_a}$ and $c=/c/\epsilon^{jk_c}$.
Now if we substitute for $a$ and $c$ then, $$E_{out}=a\epsilon^{j\phi}+c=/a/\epsilon^{j(\phi+k_a-k_c)}+/c/\epsilon^{jk_c}$$

Therefore, $E_{out}=(/a/\epsilon^{j(\phi+k_a-k_c)}+/c/)\epsilon^{jk_c}$.
The complex conjugate $$E^*=(/a/\epsilon^{-j(\phi+k_a-k_c)}+/c/)\epsilon^{-jk_c}$$

Light intensity is a product of E and E*. Thus, $$I=EE^*=/a/^2+/c/^2+2/a//c/\cos(\phi+k_a-k_c)$$

The $/a/^2+/c/^2$ term represents the "background" light component because it does not depend on $\phi$. The $2/a//c/\cos(\phi+k_a-k_c)$ represents the portion of the light from which the desired output will be derived. Now the fundamental amplitude $2/a//c/$ can be maximized with respect to $/a/^2+/c/^2$ by making $/a/=/c/$.

$$I=2/a/^2+2/a/^2\cos(\phi+k_a-k_c)$$
$$=2/a/^2[1+\cos(\phi+k_a-k_c)]$$

This clearly establishes that intensity versus the phase retardation is a sinusoid in nature and further that the operating or Q point is determined by varying the constants. Such a curve is shown in FIG. 4.

We first seek to show how the $I-\phi$ expression can result in an optimally linear system.

$$\text{Now } \cos\left(\phi-\frac{\pi}{2}\right)=\sin\phi$$

$$\text{Set } k_a-k_c=-\frac{\pi}{2}$$

$$k_c-k_a=\pi/2$$

$$\therefore I=2/a/^2[1+\sin\phi]$$

Recollecting that $b-a=c$; $b=c+a$ and $/a/=/c/$ and substituting $$b=/a/\epsilon^{jk_c}+/a/\epsilon^{jk_a}$$

$$b=/a/[\epsilon^{jk_c}+\epsilon^{jk_a}]$$

$$b=/a/\epsilon^{jk_a}[\epsilon^{j[k_c-k_a]}+1]$$

$$\therefore b=/a/\epsilon^{jk_a}\left[\epsilon^{j\frac{\pi}{2}}+1\right]=a(1+j)=[b]\epsilon^{jk_b}$$

One solution set relating the physical constants $/a/$, $/b/$, $k_a$, and $k_b$ to the relationship $b=a(1+j)$ is $$/a/=\frac{1}{\sqrt{2}}k_a=0$$

$$/b/=1\ k_b=\frac{\pi}{4}$$

In FIG. 4 the sinusoidal expression relating phase and intensity is set forth. In this diagram the fluctuation P is centered about the DC value Q. The most general characteristic is, of course, that P is less than or equal to Q. Proper design should make P equal to Q to minimize background light relative to obtainable modulation strength. As is apparent, the operating point is related to the offset R. This, of course, is a matter of design choice once a point, for example, of linear operation has been selected. The best mode of linear operation is for the quiescent point to be on points A or B of the sinusoid. Indeed, the best linear operation is obtained where the center portion of the mask achieves a relative phase delay between the zero frequency and fundamental frequency component of $$\frac{\lambda}{8}\pm\frac{\lambda}{100}$$

where $\lambda$ is the free space wavelength of the original collimated light. Also, it is convenient that the attenuation of the central portion element be substantially zero. Conversely, the electric field attenuation of the outer portion of the mask with respect to the non-zero frequency components should be approximately $1/\sqrt{2}$.

The central portion element may be formed by the deposition of thin films of zinc sulphide and magnesium oxide in alternate layers to the desired $$\frac{\lambda}{8}\pm\frac{\lambda}{100}$$

thickness. Now in the region surrounding the center portion of the plate, attenuation of light intensity must be adjusted empirically to be one-half of the light intensity attenuation of the center portion of the mask. Now since the light intensity is the square of the electric field, then the attenuation of the electric field component is of the order of $1/\sqrt{2}$.

Lenses 30 and 34 may be any form of standard condensing lenses and are interposed in the path in the first instance (lens 30) to focus the emergent spatially distributed electric field upon the mask and in the second instance (lens 34) to permit a utilization circuit to be positioned within a convenient distance. The focal lengths in this case referencing FIG. 1B may or may not be equal and it is within the contemplation of this invention that compound lens systems for special purposes or indeed electromagnetic focusing apparatuses may be used in place of the lenses.

FIG. 5A shows the optical modulator apparatus in which the utilization circuit 5 is the multiplication element of a correlation apparatus. It may be recalled, that correlation more particularly cross-correlation, is the summation of a group of product signals formed by multiplying first signals by corresponding second signals to yield product signals which then may be integrated (summed) over a time interval.

In FIG. 5A reference signal source 4 modulates monochromatic light form source 1. The varying intensity light beam emerging from wave filter 3 is displayed upon an image orthicon tube 51 face. A second set of modulation signals is applied from source 53 onto a grid or other scanning beam modulating device within an image orthicon tube 51.

FIG. 5B shows typical modulated second signals in the form of radar return (chirp) signals. Such radar return signals frequently overlap each other in time. These may be graphically represented on a frequency $f$ versus time $t$ plot in which each signal has a frequency bandwidth W. A portion of the $k-1$, $k$, and the $k+1$ radar return signals overlap. This may be seen in FIG. 5C as an overlap on grid 52 in which the signals $$g\left(t-\frac{2R_1}{c}\right), g\left(t-\frac{2R_2}{c}\right), \text{ and } g\left(t-\frac{2R_3}{c}\right)$$

correspond to the $k-1$, $k$, and $k+1$ signals shown in FIG. 5B. Now the modulating first signals or reference signals appear as a moving waveform within the beam 51 in the form of $$g\left(t-\frac{x}{v_s}\right)$$

moving within a distance $x$ corresponding to a distance on the tube face. This, of course, is the moving waveform version of the original modulated first signals $g(t)$.

The overlapping radar return chirp signals produced by a source of time varying Doppler signals can be resolved one from the other by means of pulse compression. Mathematically, pulse compression involves the cross-correlation of the signal return (a sum of time varying Doppler signals with a reference signal). Now the multiplication is performed in the embodiment shown in FIGS. 5A–5C by means of the "double modulation" of the image orthicon tube scanning beam.

If we assume that multiple targets all have different ranges R, then the radar return signals may be represented as $$g\left(t-\frac{2R_1}{c}\right)+g\left(t-\frac{2R_2}{c}\right)+g\left(t-\frac{2R_3}{c}\right)$$

If the modulated light beam function $$g\left(t-\frac{x}{v_s}\right)$$

is cross-correlated with the radar return signals, then product signals represented by the image orthicon electron scanning beam of the form $$g\left(t-\frac{x}{v_s}\right)\sum_{i=1}^{n}g(t-k_i)$$

will be generated.

The peaked values of the product signals will occur where $$\frac{x}{v_s}=\frac{2R_k}{c}$$

This is graphically presented in FIG. 5D. Correlation is achieved by integrating these peaked product signals over a time interval and is shown in FIG. 5A as element 54 electrically coupling the output of the image orthicon tube 51.

By way of summary, an optical modulation apparatus has been shown in which collimated monochromatic light has its electric field spatially varied in response to an applied modulating first signal. The modulating apparatus has a sinusoid light intensity variation versus phase retardation characteristic. The operating point of the modulator may be selectively maintained in either a linear or non-linear region of this characteristic by the use of a filter mask in which selective phase delay and attenuation properties of the mask elements control the modulator operating point.

Another embodiment which employed the modulator in a correlation apparatus was shown. In this latter embodiment, a multiplying element such as an image orthicon tube forms distinctive product signals between the modulated light signals from the optical modulation apparatus and overlapping second modulating signals to produce peaked product signals which could be integrated over a time interval for correlation purposes.

I claim:
1. An optical modulation apparatus comprising:
   a modulating signal source;
   a collimated monochromatic light source;
   means coupling the signal and light sources and having a sinusoid light intensity variation versus phase retardation characteristic for spatially varying the incident collimated monochromatic light wave as the modulating parameter of the signal varies, said spatially distributed light wave having time varying and time invariant components thereof; and
   means including a phase retarding spatial filter interposed in the path of the spatially varying light wave for both shifting the phase of the time invariant component by a predetermined amount, and for attenuating the time varying components by a predetermined amount thereby maintaining the response of the modulating apparatus to the modulation signal to be within a predetermined region of the characteristic.

2. An optical modulation apparatus comprising:
   a modulating signal source;
   a collimated monochromatic light source;
   means coupling the signal and light sources and having a sinusoid light intensity variation versus phase retardation characteristic for spatially varying the incident collimated monochromatic light beam as the modulating parameter of the signal varies, said spatially distributed light beam having time varying and time invariant components thereof; and
   means including a phase retarding spatial filter interposed in the path of the spatially varying light beam, said spatial filter being in the form of a mask and having a center portion thereof for shifting the phase of the time invariant component by a predetermined amount of the wavelength of a pre-selected one of the time varying component wavelengths, and an adjacent mask portion thereof for attenuating the time varying components by a predetermined amount.

3. An optical modulation apparatus according to claim 2, wherein:
   the means interposed in the path of the spatially varying light beam also include a first and second inverting lens spaced apart and located at different fixed distances along the path on opposite sides of the mask.

4. An optical modulation apparatus comprising:
   a modulating signal source;
   a collimated monochromatic light source;
   means coupling the signal and light sources and having a sinusoid light intensity variation versus phase retardation characteristic for spatially varying the incident collimated monochromatic light beam as the modulating parameter of the signal varies, said spatially distributed light beam having time varying and time invariant components thereof; and means including a phase retarding spatial filter interposed in the path of the spatially varying light beam for shifting the phase of the time invariant component one-eighth of the wavelength of the lowest frequency time varying component, and for attenuating the time varying components by $1/\sqrt{2}$, thereby maintaining the response of the modulation apparatus to the modulation signal to be within a linear region of the characteristic.

5. An optical modulation apparatus according to claim 4, wherein:
the means interposed in the path of the spatially varying light beam comprise:
a mask having at its center portion an element for shifting the time invariant component phase and an adjacent area for attenuating the time varying components; and
means for projecting the spatially varying light beam upon the mask.

6. An optical modulation apparatus according to claim 5, wherein:
the phase shift of the element in the center portion of the mask must lie within the range $$\frac{\lambda}{8} \pm \frac{\lambda}{100}$$

where $\lambda$ is the wavelength of the lowest frequency time varying component.

7. An optical modulation apparatus comprising:
a transparent acoustic delay line acoustically responsive to an applied modulated signal for spatially distributing an incident collimated monochromatic light beam along the acoustic propagation path, the spatially distributed light beam having time varying and time invariant components thereof;
a mask interposed in the path of the spatially varying light beam having a center portion including an element for delaying the phase of the time invariant component by a predetermined amount of the wavelength of the lowest frequency time varying component, and an adjacent portion for attenuating the time varying components by a predetermined amount; and
a lens for focusing the spatially varying light beam emergent from the delay line upon the mask.

References Cited
UNITED STATES PATENTS

| | | |
|---|---|---|
| 3,045,530 | 7/1962 | Tsujiuchi. |
| 3,189,746 | 6/1965 | Slobodin et al. |
| 3,240,108 | 3/1966 | Lehan et al. |

JOHN K. CORBIN, Primary Examiner

U.S. Cl. X.R.

235—181; 350—162